United States Patent [19]
Ota et al.

[11] Patent Number: 5,497,847
[45] Date of Patent: Mar. 12, 1996

[54] SINGLE LEVER FOR CONTROLLING MULTIPLE FUNCTIONS

[75] Inventors: Singo Ota; Hiroshi Nakagami, both of Hirakata, Japan

[73] Assignee: Kabushiki Kaisha Komatsu Seisakusho, Tokyo, Japan

[21] Appl. No.: 330,020

[22] Filed: Oct. 27, 1994

[30] Foreign Application Priority Data

Oct. 27, 1993 [JP] Japan ................................. 5-291238

[51] Int. Cl.⁶ .................................................. B60K 26/00
[52] U.S. Cl. ..................... 180/333; 180/336; 74/471 XY
[58] Field of Search ..................................... 180/333, 336, 180/6.32; 74/471 XY, 335, 473 R

[56] References Cited

U.S. PATENT DOCUMENTS

| | | | |
|---|---|---|---|
| 3,350,956 | 11/1967 | Monge | 74/471 XY |
| 3,540,220 | 11/1970 | Lauck | 180/333 |
| 3,891,042 | 6/1975 | Braun | 180/333 |
| 4,060,005 | 11/1977 | Bost | 74/471 XY |
| 4,169,443 | 10/1979 | Todeschini | 74/471 XY |
| 4,321,980 | 3/1982 | Nissen | 180/333 |
| 5,042,314 | 8/1991 | Rytter et al. | 74/335 |

FOREIGN PATENT DOCUMENTS

6-33218   4/1994   Japan.

*Primary Examiner*—Paul N. Dickson
*Attorney, Agent, or Firm*—Richards, Medlock & Andrews

[57] ABSTRACT

An operator lever device for a tracked vehicle equipped with a steering valve for controlling steering operations, a first transmission valve for selecting forward/backward traveling operation and a second transmission valve for controlling speed changing operations, has a rotary yoke shaft which is disposed horizontally in the front-and-rear directions with respect to an operator, a yoke mounted on an end of the rotary yoke shaft so as to be pivotable in the left-and-right directions, a cruciform member which is mounted to the yoke by pivot pins so as to be pivotable in the front-and-rear direction, and a single operator lever which is mounted upright in the cruciform member so as to be rotatable about the longitudinal axis of the operator lever. The operator can easily steer, select forward/backward operation, and change the speed stage of the vehicle by using only the single operator lever.

18 Claims, 3 Drawing Sheets

SINGLE LEVER FOR CONTROLLING MULTIPLE FUNCTIONS

FIELD OF THE INVENTION

The invention relates to a single operator lever device for controlling a plurality of functions. In a particular aspect, the invention relates to a single operator lever for controlling steering, forward/backward operation, and speed changing for a tracked vehicle.

BACKGROUND OF THE INVENTION

A conventional operator lever device in a tracked vehicle generally has a total of two steering levers, located on opposite sides of an operator seat, in order to permit the operator to actuate one or more steering valves which control steering operations of the tracked vehicle. When the operator pulls the left steering lever towards him, this causes the vehicle to turn left. Similarly, when the operator pulls the right steering lever towards him, this causes the vehicle to turn right.

In addition, a transmission lever is provided at one side of the operator seat in order to provide for the actuation of a speed change gear by the operator. The transmission lever is used to select a forward operation or a backward operation for the vehicle, and to control the vehicle speed in either a forward operation or a backward operation.

However, in such conventional construction, an operator needs to change levers in order to switch the steering direction from left to right or from right to left, as well as to switch from a steering operation to a speed changing operation or from a speed changing operation to a steering operation. Hence, it is difficult for the operator to operate the vehicle smoothly. Also, a significant manual effort by the operator is required to actuate the various levers being operated, causing operator fatigue.

SUMMARY OF THE INVENTION

In view of the foregoing problem, it is an object of the invention to provide an operator lever device which facilitates the efforts of an operator in controlling a plurality of functions through the manipulation of a single operator lever. It is an object of a specific embodiment of the invention to provide an operator lever device for a tracked vehicle which facilitates the efforts of an operator in changing the steering direction, in changing the forward/backward direction of travel, and in changing the vehicle speed, thereby reducing operator fatigue.

In accordance with the invention, an operator lever device, employing a single operator lever for operating a plurality of functions, comprises: a rotary yoke shaft having a longitudinal axis extending in a first direction; a yoke secured to one end of the rotary yoke shaft so as to be rotatable about the longitudinal axis of the rotary yoke shaft; a cruciform member which is pivotally mounted between the prongs of the yoke so as to be pivotable about a pivot axis which is generally perpendicular to the first direction; and an operator lever which is mounted to the cruciform member so as to be rotatable about a longitudinal axis of the operator lever which is generally perpendicular to the pivot axis.

A first end of a first lever member can be fixedly secured to the rotary yoke shaft for rotation of the first lever member with the rotary yoke shaft about the longitudinal axis of the rotary yoke shaft, and the second end of the first lever member can be connected by a first linkage to a first control valve for operating the first control valve.

The cruciform member can be connected by a second linkage to a second control valve for operating the second control valve, with the second linkage comprising a first ball-and-socket joint connected to the cruciform member. The center of the first ball-and-socket joint is preferably positioned on the axis of the rotary yoke shaft when the operator lever is in its neutral position.

A first end of a second lever member can be fixedly secured to an end of the operator lever for rotation therewith, while the second end of the second lever member can be connected by a third linkage to a third control valve for operating the third control valve. The third linkage can include a second ball-and-socket joint connected to the second end of the second lever member.

In addition to the two ball-and socket joints, the second and third linkages can collectively comprise: a lateral rotary shaft; an annular sleeve positioned coaxially with and about a portion of the length of the lateral rotary shaft; a third lever member having a first end thereof fixedly secured to the lateral rotary shaft, the second end of the third lever member being pivotally connected to one end of a first link, the second end of the first link being connected to the first ball-and-socket joint; a fourth lever member having a first end thereof fixedly secured to the annular sleeve, the second end of the fourth lever member being pivotally connected to a first end of a second link, the second end of the second link being connected to the second ball-and-socket joint; a fifth lever member having a first end thereof fixedly secured to the annular sleeve for rotation therewith, a linkage connected between the second end of the fifth lever member and the third control valve for operating the third control valve; and a sixth lever member having a first end thereof fixedly secured to the lateral rotary shaft for rotation therewith, a linkage connected between the second end of the sixth lever member and the second control valve for operating the second control valve.

In a tracked vehicle equipped with a steering valve for controlling steering operations, a transmission valve for selecting one of a forward traveling operation and a backward traveling operation, and a transmission valve for changing traveling speed stages; an operator lever device according to the invention has a rotary yoke shaft disposed horizontally in the front-and-rear directions with respect to an operator, a yoke fixedly secured to one end of the shaft so that the yoke is pivotable by the rotary yoke shaft in the right-and-left directions, a cruciform member pivotally mounted between the prongs of the yoke so as to be pivotable in the front-and-rear directions, and an operator lever mounted generally vertically in the cruciform member so as to be rotatable about the longitudinal axis of the operator lever. A first lever member, linked to the steering valve which controls steering operations, can be fixedly secured to the rotary yoke shaft for rotation therewith. A first ball-and-socket joint can link the cruciform member to the transmission valve which controls the selection of a forward traveling operation or a rearward traveling operation. The center of the first ball-and-socket joint is preferably positioned on the axis of the rotary yoke shaft when the operator lever is in its neutral position.

The single operator lever can be equipped with a second lever member at the bottom end thereof for rotation therewith, with the second lever member being linked through a second ball-and-socket joint to the transmission valve which controls the vehicle speed stage. A knob can be attached to the top end of the operator lever.

As the first lever member, linked to the steering valve, is fixedly secured to the rotary yoke shaft, the operator can operate the steering valve by moving the operator lever from its neutral position to the right or left to thereby rotate the rotary yoke shaft and the yoke.

As the cruciform member is connected through the first ball-and-socket joint to the transmission valve which controls the selection of the forward and backward traveling operations, the operator can operate the transmission valve for selecting a forward traveling operation or a backward traveling operation by moving the operator lever forwardly or backwardly from its neutral position to thereby pivot the cruciform member forwardly or backwardly.

As the second lever member, linked to the transmission valve which controls the vehicle speed stage, is provided on the operator lever at the bottom end thereof, the operator can operate the transmission valve for selecting the vehicle speed stage by rotating the operator lever about its longitudinal axis.

Accordingly, the operator can easily steer the vehicle, can readily select the desired forward/backward operation of the vehicle, and can readily change the speed stage of the vehicle traveling, using only the single operator lever. In particular, the operator can change the steering direction and can change the speed stages of the vehicle without having to change the knobs being operated. Hence, operator fatigue is reduced.

BRIEF DESCRIPTION OF THE DRAWINGS

These and other features and advantages of the invention will be more clearly understood from the following detailed description of the preferred embodiment of the invention with reference to the accompanying drawings in which.

DESCRIPTION OF THE PREFERRED EMBODIMENT

An operator lever device for a tracked vehicle according to an embodiment of the invention will now be described in detail with reference to FIGS. 1–4.

Figure 1:
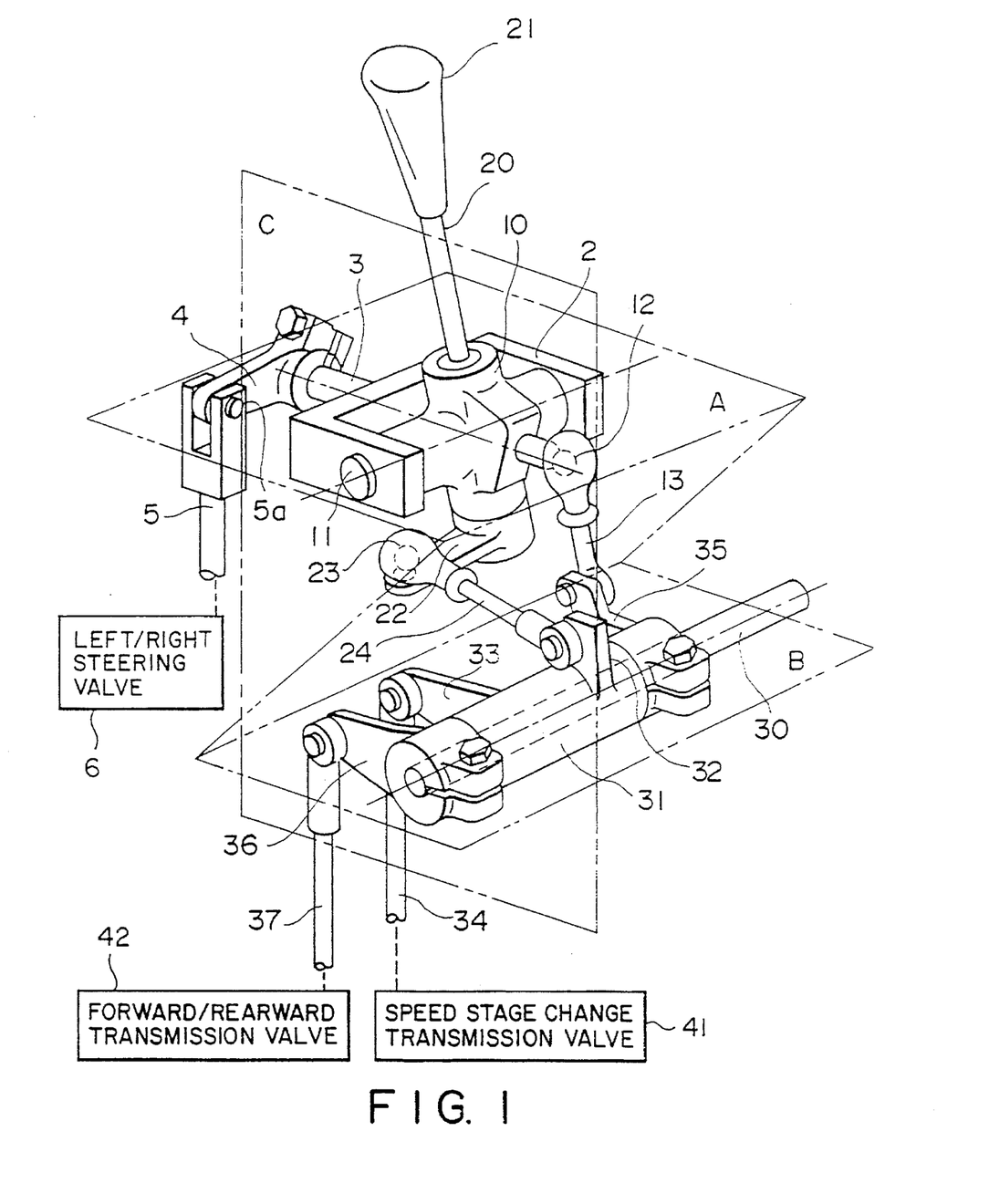
FIG. 1 is a perspective view of an operator lever device according to an embodiment of the invention.
Figure 2:
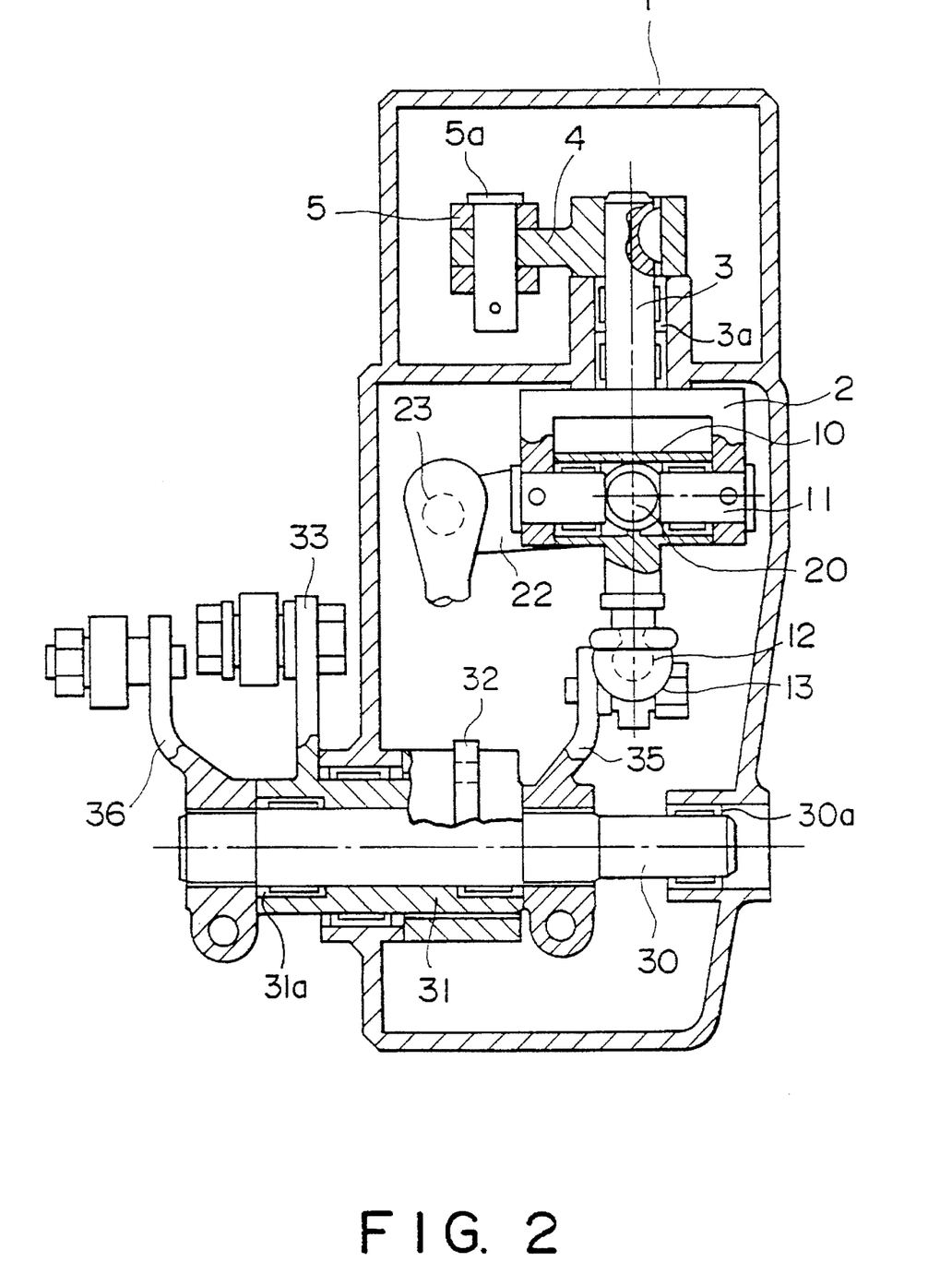
FIG. 2 is a composite sectional view through the horizontal planes A and B of FIG. 1.
Figure 3:
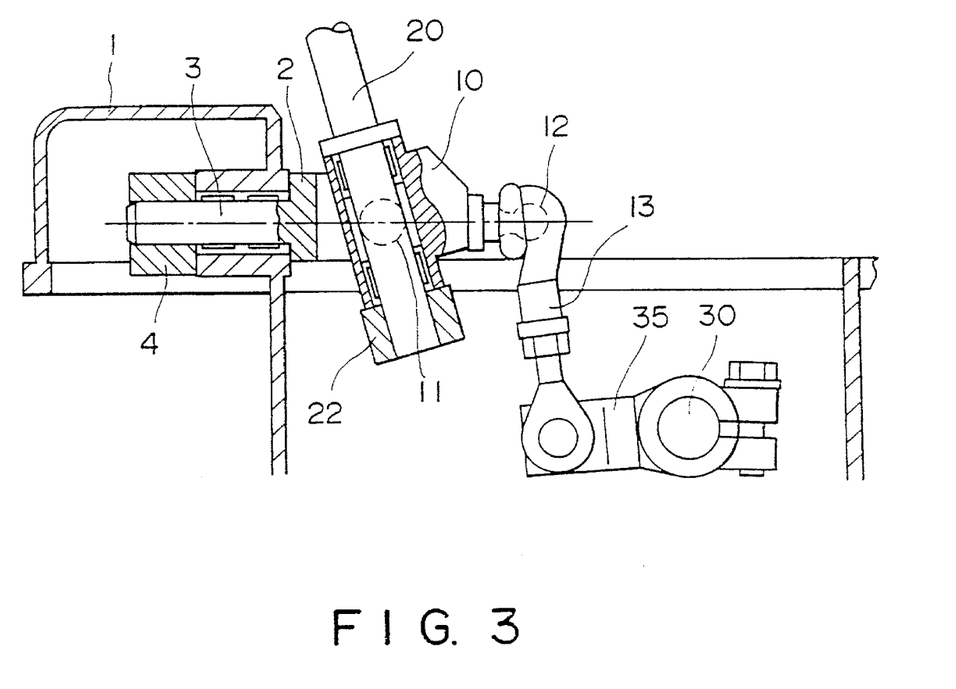
FIG. 3 is a partial sectional view through the vertical plane C of FIG. 1.

As shown in FIGS. 1–3, a rotary yoke shaft 3 is mounted horizontally in a housing case 1 by a bearing 3a so that the rotary yoke shaft 3 is rotatable about its longitudinal axis, with the longitudinal axis of the rotary yoke shaft 3 extending in the front-and-rear directions with respect to an operator. One end of rotary yoke shaft 3 is fixedly secured to the transverse member of a U-shaped yoke 2, while the other end of the rotary yoke shaft 3 is fixedly secured to one end of a first lever member 4. The prongs of the U-shaped yoke 2 extend generally parallel to the longitudinal axis of the rotary yoke shaft 3. The second end of the first lever member 4 is pivotally connected to an upper end of a push-pull rod 5 by a pivot pin 5a. The rod 5 is linked to a hydraulic steering valve 6 which controls the operations of turning the vehicle to the right or to the left.

A single operator lever 20 is rotatably mounted coaxially within a first cross element of a cruciform member 10 such that a major portion of the operator lever 20 extends above the cruciform member 10 while the lower end portion of the operator lever 20 extends below the cruciform member 10. A knob 21 can be positioned on the upper end of the operator lever 20 to facilitate gripping of the operator lever 20 by the vehicle operator. A second lever member 22 is fixedly secured to the lower portion of the operator lever 20 for rotation therewith about the longitudinal axis of the operator lever 20.

The second cross element of the cruciform member 10 is provided with a pivot pin 11 in each end thereof so that the cruciform member 10 can be pivotally mounted between the prongs of the yoke 2 by the pivot pins 11 with the first cross element of the cruciform 10 extending generally vertically. This pivotal mounting of the cruciform 10 between the prongs of the yoke 2 permits the upper end of the operator lever 20 to be moved by the operator forwardly (toward the rotary yoke shaft 3) or rearwardly (away from the rotary yoke shaft 3), i.e., in the front-and-rear directions with respect to the operator, without the necessity of rotating the operator lever 20 about its longitudinal axis. The rotational mounting of the operator lever 20 within the first cross element of the cruciform 10 permits the operator lever 20 to be rotated about its longitudinal axis without the necessity of altering the orientation of the cruciform member 10 or the yoke 2.

One end portion of a lateral rotary shaft 30 is mounted in one side of the case 1 by a bearing 30a, with the lateral rotary shaft 30 extending through the interior of the case 1 so that the other end portion of the lateral rotary shaft 30 extends outside of the opposite side of the case 1. The lateral rotary shaft 30 extends generally horizontally in the right-and-left directions. A first ball-and-socket joint 12 provides a variable direction linking of the cruciform member 10 with one end of a first link member 13. In the illustrated linkage, the ball of the first ball-and-socket joint 12 is mounted on the cruciform member 10, while the socket of the first ball-and-socket joint 12 is mounted on the end of the first link member 13. The other end of the first link member 13 is pivotally connected to one end of a third lever member 35. The other end of the third lever member 35 is fixedly secured to lateral rotary shaft 30 for rotation therewith about the longitudinal axis of lateral rotary shaft 30. The linkage is set such that the center of the first ball-and-socket joint 12 is positioned on the axis of the rotary yoke shaft 3 when the operator lever 20 is in its neutral position.

An annular cylindrical sleeve member 31 is mounted coaxially with lateral rotary shaft 30 so as to surround a portion of the length of the lateral rotary shaft 30 within the case 1 and a portion of the length of the lateral rotary shaft 30 outside of the case 1, and to permit free rotation of the sleeve member 31 with respect to the lateral rotary shaft 30 about their common longitudinal axis. One end of a fourth lever member 32 is fixedly secured to the outer periphery of sleeve member 31, e.g., by being integrally formed therewith, at a location along the longitudinal length of the sleeve member 31 which is within the housing 1.

A second ball-and-socket joint 23 provides a variable direction linking of the distal end of the second lever member 22 to one end of a second link member 24. In the illustrated linkage, the ball of the second ball-and-socket joint 23 is mounted on the second end of the second lever member 22, while the socket of the second ball-and-socket joint 23 is mounted on the first end of the second link member 24. The second end of the second link member 24 is pivotally connected to the distal end of the fourth lever member 32.

One end of a fifth lever member 33 is fixedly connected to the outer periphery of the sleeve member 31, e.g., by being integrally formed therewith, at a location along the longitudinal length of the sleeve member 31 which is outside of the housing 1. An annular bearing 31a is positioned between sleeve member 31 and the housing 1 at a location along the longitudinal length of the sleeve member 31 between the fourth lever member 32 and the fifth lever member 33, to thereby rotatably support the sleeve member 31. The distal end of the fifth lever member 33 is pivotally connected to the upper end of a push-pull rod 34. The rod 34 is linked to a hydraulic transmission valve 41 which controls a speed change gear for effecting a change of speed stage of the vehicle.

One end of a sixth lever member 36 is fixedly secured to the outer end of lateral rotary shaft 30 for rotation therewith, while the distal end of the sixth lever member 36 is pivotally connected to the upper end of a push-pull rod 37. The push-pull rod 37 is linked to a hydraulic transmission valve 42 which controls the selection of the forward/backward direction of travel of the vehicle. The position of the sleeve member 31 along the longitudinal length of the lateral rotary shaft 30 is maintained by having the third lever member 35 fixedly secured to the lateral rotary shaft 30 at one end of the sleeve member 31 and the sixth lever member 36 fixedly secured to the lateral rotary shaft 30 at the other end of the sleeve member 31.

Operations of the embodiment will now be described.

Figure 4:
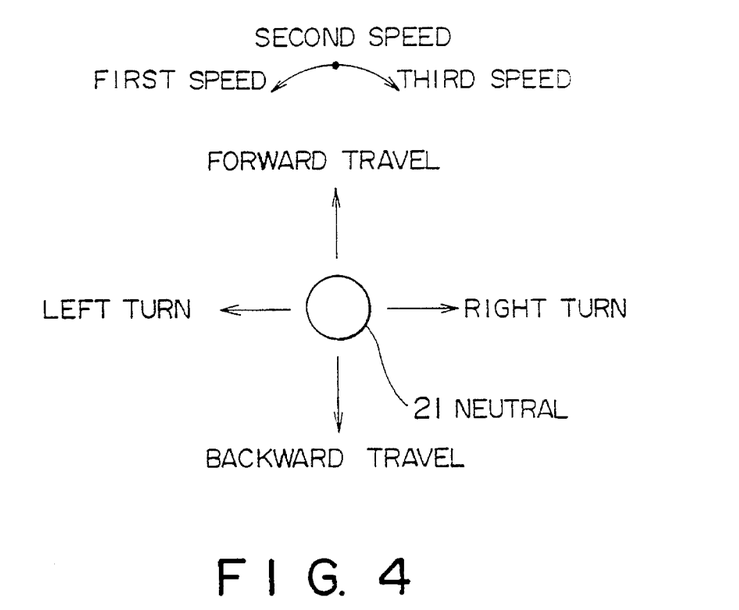
FIG. 4 shows the relationship between operational movements of the operator lever knob by the operator and the corresponding operations of the vehicle.

When the knob 21, attached to the top end of the operator lever 20, is manually moved by the operator from the neutral position of the operator lever 20 to the left turn position of the operator lever illustrated in FIG. 4, the rotary yoke shaft 3 and the yoke 2 turn counterclockwise, as viewed in FIG. 1, causing the first lever member 4 to push the rod 5 downwardly. Consequently, the hydraulic steering valve 6 is operated to cause the vehicle to turn to the left. On the other hand, when the knob 21 is manually moved by the operator from the neutral position of the operator lever 20 to the right turn position of the operator lever 20 illustrated in FIG. 4, the rotary yoke shaft 3 and the yoke 2 turn clockwise, as viewed in FIG. 1, causing the first lever member 4 to pull the rod 5 upwardly. Consequently, the hydraulic steering valve 6 is operated to cause the vehicle to turn to the right. If the operator releases the knob 21, the operator lever 20 will automatically return to its neutral position, thereby permitting the vehicle to move in a straight line.

When the knob 21 is manually moved by the operator from the neutral position of the operator lever 20 to the forward travel position of the operator lever illustrated in FIG. 4, the cruciform member 10 rotates counterclockwise, as viewed in FIG. 1, about the pivot pins 11, and the first ball-and-socket joint 12 pulls the first link 13 upwardly, thereby causing the third lever member 35 to rotate clockwise, as viewed in FIG. 1, which in turn causes the clockwise rotation of the lateral rotary shaft 30. The resulting rotation of the lateral rotary shaft 30 causes the sixth lever member 36 to also rotate clockwise, pulling the push-pull rod 37 upwardly, thereby operating the hydraulic transmission valve 42, which controls the selection of forward travel or backward travel, to select forward travel.

On the other hand, when the knob 21 is manually moved by the operator from the neutral position of the operator lever 20 to the rearward travel position of the operator lever illustrated in FIG. 4, the cruciform member 10 rotates clockwise, as viewed in FIG. 1, about the pivot pins 11, and the first ball-and-socket joint 12 pushes the first link 13 downwardly, thereby causing the third lever member 35 to rotate counterclockwise, as viewed in FIG. 1, which in turn causes the counterclockwise rotation of the lateral rotary shaft 30. The resulting rotation of the lateral rotary shaft 30 causes the sixth lever member 36 to also rotate counterclockwise, pushing the push-pull rod 37 downwardly, thereby operating the hydraulic transmission valve 42, which controls the selection of forward travel or backward travel, to select rearward travel. The knob 21 is held at the selected forward/backward travel position by means of a detent provided at the forward/backward transmission valve 42.

As the setting is made such that the center of the first ball-and-socket joint 12 is positioned on the axis of the rotary yoke shaft 3 when the operator lever 20 is in its neutral position, the arc movement of the knob 21 is minimized when the operator turns the vehicle to the left or to the right with the knob 21 held at the forward or the backward position, thus providing excellent operability.

Also, when the knob 21 is rotated clockwise, as illustrated in FIG. 1, about its longitudinal axis to the third speed position illustrated in FIG. 4, the second lever member 22 located at the bottom end of the operator lever 20 is also rotated clockwise to cause the second ball-and-socket joint 23 to pull the second link 24, causing the fourth lever member 32 and the sleeve member 31 to rotate counterclockwise about the longitudinal axis of the lateral rotary shaft 30. In turn, this rotation of the sleeve member 31 causes the counterclockwise rotation of the fifth lever member 33, pushing the push-pull rod 34 downwardly to operate the transmission valve 41 which controls the vehicle speed stage, thereby bringing the stage of vehicle speed to the third speed stage.

On the other hand, when the knob 21 is rotated counterclockwise, as illustrated in FIG. 1, about its longitudinal axis from the third speed stage position to the second speed stage position illustrated in FIG. 4, the second lever member 22 located at the bottom end of the operator lever 20 is also rotated counterclockwise to cause the second ball-and-socket joint 23 to push the second link 24, causing the fourth lever member 32 and the sleeve member 31 to rotate clockwise about the longitudinal axis of the lateral rotary shaft 30. In turn, this rotation of the sleeve member 31 causes the clockwise rotation of the fifth lever member 33, pulling the push-pull rod 34 upwardly to operate the transmission valve 41 which controls the vehicle speed stage, thereby bringing the stage of vehicle speed from the third speed stage to the second speed stage.

When the knob 21 is further rotated counterclockwise about its longitudinal axis from the second speed stage position to the first speed stage position illustrated in FIG. 4, the push-pull rod 34 is pulled up further to bring the vehicle speed stage to the first speed stage. The knob 21 is releasably held at each speed position by means of a detent provided at the speed stage transmission valve 41.

As described above, the operator can easily manipulate a single operator lever to steer the vehicle, to select forward travel or backward travel, and to change the speed stage of the vehicle. In particular, the operator can change the direction and the speed stage of the vehicle without having to changing knobs. Accordingly, operator fatigue is reduced.

Reasonable variations and modifications are possible within the scope of the foregoing description, the drawings and the appended claims to the invention.

What is claimed is:

1. An operator lever device employing a single operator lever for operating a plurality of functions, said operator lever device comprising:

a rotary yoke shaft having a longitudinal axis extending in a first direction;

a yoke secured to one end of said rotary yoke shaft so as to be rotatable about the longitudinal axis of said rotary yoke shaft, said yoke having a pair of prongs which extend generally parallel to said first direction;

a cruciform member which is pivotally mounted between said prongs so as to be pivotable about a pivot axis which is generally perpendicular to said first direction; and an operator lever which is mounted to the cruciform member so as to be rotatable about a longitudinal axis of said operator lever which is generally perpendicular to Said pivot axis;

wherein a first end of a first lever member is fixedly secured to said rotary yoke shaft for rotation of said first lever member with said rotary yoke shaft about the longitudinal axis of said rotary yoke shaft, and wherein a second end of said first lever member is connected by a first linkage to a first control valve for operating said first control valve.

2. An operator lever device in accordance with claim 1, wherein said cruciform member is connected by a second linkage to a second control valve for operating said second control valve, said second linkage comprising a first ball-and-socket joint connected to said cruciform member.

3. An operator lever device in accordance with claim 2, wherein the center of said first ball-and-socket joint is positioned on the axis of said rotary yoke shaft when said operator lever is in its neutral position.

4. An operator lever device in accordance with claim 3, wherein a first end of a second lever member is fixedly secured to an end of said operator lever for rotation therewith, a second end of said second lever member being connected by a third linkage to a third control valve for operating said third control valve.

5. An operator lever device in accordance with claim 1, wherein said third linkage comprises a second ball-and-socket joint connected to the second end of said second lever member.

6. An operator lever device employing a single operator lever for operating a plurality of functions, said operator lever device comprising:

a rotary yoke shaft having a longitudinal axis extending in a first direction;

a yoke secured to one end of said rotary yoke shaft so as to be rotatable about the longitudinal axis of said rotary yoke shaft, said yoke having a pair of prongs which extend generally parallel to said first direction;

a cruciform member which is pivotally mounted between said prongs so as to be pivotable about a pivot axis which is generally perpendicular to said first direction; and an operator lever which is mounted to the cruciform member so as to be rotatable about a longitudinal axis of said operator lever which is generally perpendicular to said pivot axis;

first, second, and third control valves;

a first lever member having a first end thereof fixedly secured to said rotary yoke shaft for rotation of said first lever member with said rotary yoke shaft about the longitudinal axis of said rotary yoke shaft, a second end of said first lever member being connected by a first linkage to said first control valve for operating said first control valve;

a second lever member having a first end thereof fixedly secured to an end of said operator lever for rotation therewith;

a lateral rotary shaft;

an annular sleeve positioned coaxially with and about a portion of the length of said lateral rotary shaft;

a first ball-and-socket joint connected to said cruciform member;

a third lever member having a first end thereof fixedly secured to said lateral rotary shaft, a second end of said third lever member being pivotally connected to one end of a first link, the second end of said first link being connected to said first ball-and-socket joint;

a second ball-and-socket joint connected to a second end of said second lever member;

a fourth lever member having a first end thereof fixedly secured to said annular sleeve, a second end of said fourth lever member being pivotally connected to a first end of a second link, a second end of said second link being connected to said second ball-and-socket joint;

a fifth lever member having a first end thereof fixedly secured to said annular sleeve for rotation therewith, a second linkage being connected between a second end of said fifth lever member and said third control valve for operating said third control valve; and a sixth lever member having a first end thereof fixedly secured to said lateral rotary shaft for rotation therewith, a third linkage being connected between a second end of said sixth lever member and said second control valve for operating said second control valve.

7. An operator lever device in accordance with claim 6, wherein the center of said first ball-and-socket joint is positioned on the longitudinal axis of said rotary yoke shaft when said operator lever is in its neutral position.

8. An operator lever device employing a single operator lever for operating a plurality of functions, said operator lever device comprising:

a rotary yoke shaft having a longitudinal axis extending in a first direction;

a yoke secured to one end of said rotary yoke shaft so as to be rotatable about the longitudinal axis of said rotary yoke shaft, said yoke having a pair of prongs which extend generally parallel to said first direction;

a cruciform member which is pivotally mounted between said prongs so as to be pivotable about a pivot axis which is generally perpendicular to said first direction; and an operator lever which is mounted to the cruciform member so as to be rotatable about a longitudinal axis of said operator lever which is generally perpendicular to said pivot axis;

wherein said cruciform member is connected by a linkage to a control valve for operating said control valve, said linkage comprising a ball-and-socket joint connected to said cruciform member.

9. An operator lever device employing a single operator lever for operating a plurality of functions, said operator lever device comprising:

a rotary yoke shaft having a longitudinal axis extending in a first direction;

a yoke secured to one end of said rotary yoke shaft so as to be rotatable about the longitudinal axis of said rotary yoke shaft, said yoke having a pair of prongs which extend generally parallel to said first direction;

a cruciform member which is pivotally mounted between said prongs so as to be pivotable about a pivot axis which is generally perpendicular to said first direction; and an operator lever which is mounted to the cruciform member so as to be rotatable about a longitudinal axis of said operator lever which is generally perpendicular to said pivot axis;

wherein a first end of a lever member is fixedly secured to an end of said operator lever for rotation therewith, a second end of said lever member being connected by a linkage to a control valve for operating said control valve, wherein said linkage comprises a ball-and-socket joint connected to an end of said lever member.

10. An operator lever device for a tracked vehicle equipped with a steering valve for controlling steering operations, a first transmission valve for selecting one of a forward traveling operation and a backward traveling operation, and a second transmission valve for controlling speed stage changing operations; said operator lever device comprising:

a rotary yoke shaft having a longitudinal axis extending in a first generally horizontal direction;

a yoke secured to one end of said rotary yoke shaft so as to be rotatable about the longitudinal axis of said rotary yoke shaft in right-and-left directions, said yoke having a pair of prongs;

a cruciform member which is pivotally mounted between said prongs so as to be pivotable in the front-and-rear directions; and an operator lever which is mounted in the cruciform member so as to be rotatable about a longitudinal axis of said operator lever;

wherein a first end of a first lever member is fixedly secured to said rotary yoke shaft for rotation of said first lever member with said rotary yoke-shaft about the longitudinal axis of said rotary yoke shaft, and wherein a second end of said first lever member is connected by a first linkage to said steering valve for operating said steering valve to control steering operations.

11. An operator lever device in accordance with claim 10, wherein said cruciform member is connected by a second linkage to said first transmission valve for operating said first transmission valve to select one of a forward traveling operation and a backward traveling operation.

12. An operator lever device in accordance with claim 11, wherein said second linkage comprises a first ball-and-socket joint connected to said cruciform member.

13. An operator lever device in accordance with claim 12, wherein the center of said first ball-and-socket joint is positioned on the longitudinal axis of said rotary yoke shaft when said operator lever is in its neutral position.

14. An operator lever device in accordance with claim 11, wherein a first end of a second lever member is fixedly secured to a bottom end of said operator lever for rotation therewith, a second end of said second lever member being connected by a third linkage to said second transmission valve for operating said second transmission valve to control speed stage change operations.

15. An operator lever device in accordance with claim 14, wherein said third linkage comprises a ball-and-socket joint connected to the second end of said second lever member.

16. An operator lever device for a tracked vehicle equipped with a steering valve for controlling steering operations, a first transmission valve for selecting one of a forward traveling operation and a backward traveling operation, and a second transmission valve for controlling speed stage changing operations; said operator lever device comprising:

a rotary yoke shaft having a longitudinal axis extending in a first generally horizontal direction;

a yoke secured to one end of said rotary yoke shaft so as to be rotatable about the longitudinal axis of said rotary yoke shaft in fight-and-left directions, said yoke having a pair of prongs;

a cruciform member which is pivotally mounted between said prongs so as to be pivotable in the front-and-rear directions; and an operator lever which is mounted in the cruciform member so as to be rotatable about a longitudinal axis of said operator lever;

a first lever member having a first end thereof fixedly secured to said rotary yoke shaft for rotation of said first lever member with said rotary yoke shaft about the longitudinal axis of said rotary yoke shaft, a second end of said first lever member being connected by a first linkage to said steering valve for operating said steering valve;

a second lever member having a first end thereof fixedly secured to an end of said operator lever for rotation therewith;

a lateral rotary shaft;

an annular sleeve positioned coaxially with and about a portion of the length of said lateral rotary shaft;

a first ball-and-socket joint connected to said cruciform member;

a third lever member having a first end thereof fixedly secured to said lateral rotary shaft, a second end of said third lever member being pivotally connected to a first end of a first link, the second end of said first link being connected to said first ball-and-socket joint;

a second ball-and-socket joint connected to a second end of said second lever member;

a fourth lever member having a first end thereof fixedly secured to said annular sleeve, a second end of said fourth lever member being pivotally connected to a first end of a second link, a second end of said second link being connected to said second ball-and-socket joint;

a fifth lever member having a first end thereof fixedly secured to said annular sleeve for rotation therewith, a second linkage being connected between a second end of said fifth lever member and said second transmission valve for operating said second transmission valve to control speed stage changes; and a sixth lever member having a first end thereof fixedly secured to said lateral rotary shaft for rotation therewith, a third linkage being connected between a second end of said sixth lever member and said first transmission valve for operating said first transmission valve to control forward/rearward operation.

17. An operator lever device for a tracked vehicle equipped with a steering valve for controlling steering operations, a first transmission valve for selecting one of a forward traveling operation and a backward traveling operation, and a second transmission valve for controlling speed stage changing operations; said operator lever device comprising:

a rotary yoke shaft having a longitudinal axis extending in a first generally horizontal direction;

a yoke secured to one end of said rotary yoke shaft so as to be rotatable about the longitudinal axis of said rotary yoke shaft in right-and-left directions, said yoke having a pair of prongs;

a cruciform member which is pivotally mounted between said prongs so as to be pivotable in the front-and-rear directions; and an operator lever which is mounted in the cruciform member so as to be rotatable about a longitudinal axis of said operator lever;

wherein said cruciform member is connected by a linkage to said first transmission valve for operating said first transmission valve, said linkage comprising a ball-and-socket joint connected to said cruciform member.

18. An operator lever device for a tracked vehicle equipped with a steering valve for controlling steering operations, a first transmission valve selecting one of a forward traveling operation and between traveling operations and a second transmission valve for controlling speed stage changing operations; said operator lever device comprising:

a rotary yoke shaft having a longitudinal axis extending in a first generally horizontal direction;

a yoke secured to one end of said rotary yoke shaft so as to be rotatable about the longitudinal axis of said rotary yoke shaft in right-and-left directions said yoke having a pair of prongs;

a cruciform member which is pivotally mounted between said prongs so as to be pivotable in the front-and-rear directions; and an operator lever which is mounted in the cruciform member so as to be rotatable about a longitudinal axis of said operator lever;

wherein a first end of a lever member is fixedly secured to a bottom end of said operator lever for rotation therewith, a second end of said lever member being connected by a linkage to said second transmission valve for operating said second transmission valve; and wherein said linkage comprises a ball-and-socket joint connected to the second end of said lever member.

* * * * *

UNITED STATES PATENT AND TRADEMARK OFFICE
CERTIFICATE OF CORRECTION

PATENT NO. : 5,497,847
DATED : March 12, 1996
INVENTOR(S) : Singo OTA et al

It is certified that error appears in the above-indentified patent and that said Letters Patent is hereby corrected as shown below:

Column 7, line 18, delete "Said" and insert --said--.

Column 7, line 42, delete "claim 1," and insert --claim 4,--.

Column 9, line 41, delete "yoke-shaft" and insert --yoke shaft--.

Column 10, line 12, delete "fight-and-left" and insert --right-and-left--.

Column 11, lines 21-22, delete "and between traveling operations" and insert --and a backward traveling operation,--.

Column 12, line 6, delete "directions" and insert --directions,--.

Signed and Sealed this

Twenty-sixth Day of November 1996

Attest:

BRUCE LEHMAN

Attesting Officer

Commissioner of Patents and Trademarks